E. GREENWOOD & A. SHARP.
APPARATUS FOR USE IN CONNECTION WITH MOLDING, SHAPING, OR OTHERWISE WORKING DOUGH.
APPLICATION FILED AUG. 18, 1917.

1,271,700.

Patented July 9, 1918.
3 SHEETS—SHEET 1.

INVENTORS:
Edgar Greenwood
Alfred Sharp
ATT'Y

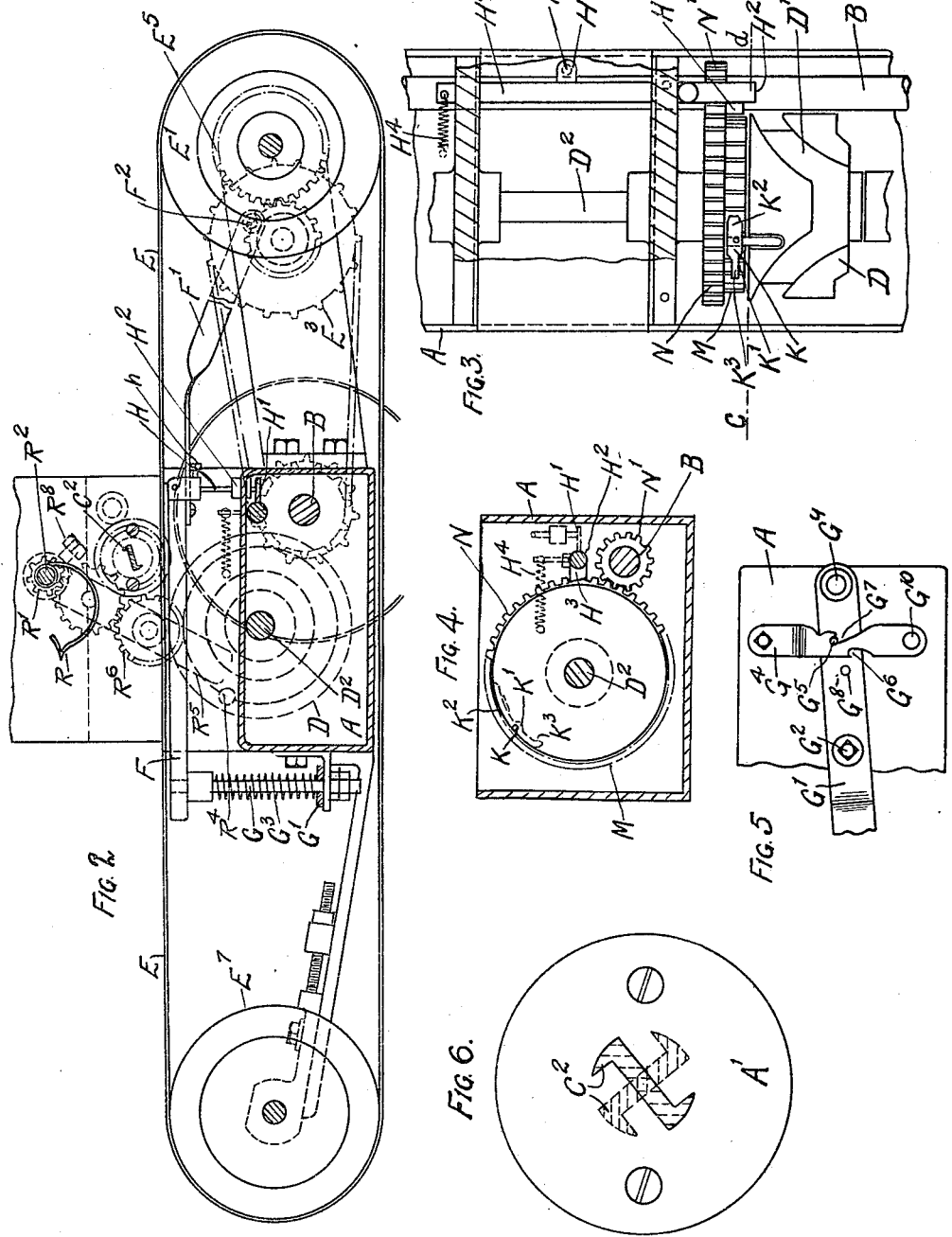
E. GREENWOOD & A. SHARP.
APPARATUS FOR USE IN CONNECTION WITH MOLDING, SHAPING, OR OTHERWISE WORKING DOUGH.
APPLICATION FILED AUG. 18, 1917.
1,271,700.
Patented July 9, 1918.
3 SHEETS—SHEET 2.

E. GREENWOOD & A. SHARP.
APPARATUS FOR USE IN CONNECTION WITH MOLDING, SHAPING, OR OTHERWISE WORKING DOUGH.
APPLICATION FILED AUG. 18, 1917.
1,271,700.
Patented July 9, 1918.
3 SHEETS—SHEET 3.
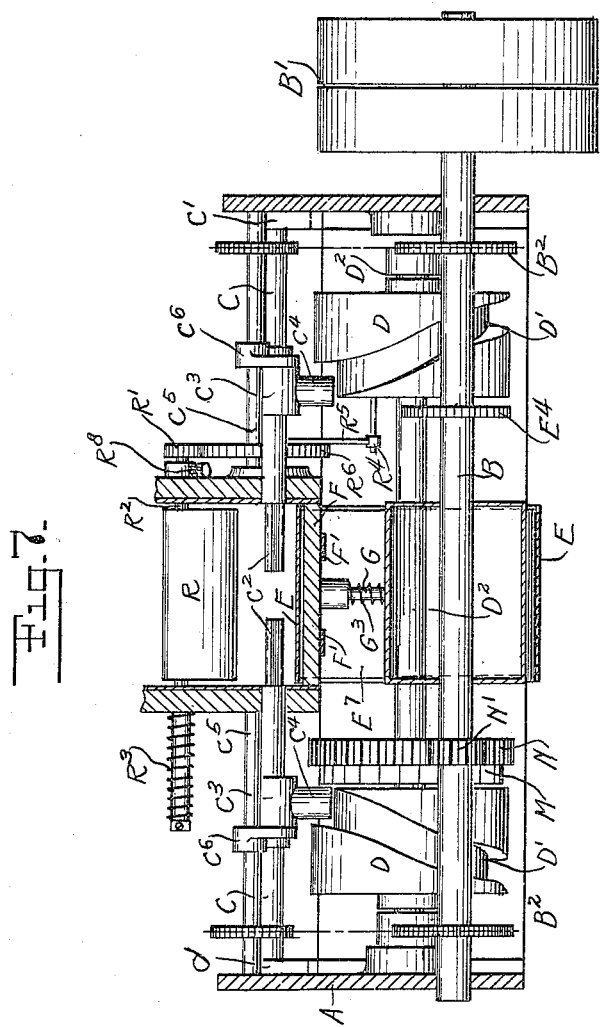
INVENTORS
Edgar Greenwood
Alfred Sharp
BY
Wm Wallace White
their ATTORNEY

UNITED STATES PATENT OFFICE.

EDGAR GREENWOOD, OF BRADFORD, AND ALFRED SHARP, OF MANCHESTER, ENGLAND.

APPARATUS FOR USE IN CONNECTION WITH MOLDING, SHAPING, OR OTHERWISE WORKING DOUGH.

1,271,700.     Specification of Letters Patent.     Patented July 9, 1918.

Application filed August 18, 1917. Serial No. 186,993.

*To all whom it may concern:*

Be it known that we, EDGAR GREENWOOD, of 288 Great Horton road, Bradford, in the county of York, and ALFRED SHARP, of 16 Fitzwarren street, Seedley, Manchester, in the county of Lancaster, both in England, and both being subjects of the King of Great Britain, have invented new and useful Improvements in and Relating to Apparatus for Use in Connection with Molding, Shaping, or Otherwise Working Dough, of which the following is a specification.

This invention relates to improvements in apparatus for use in connection with molding, shaping or otherwise working dough for bread making, that is to say, prior to its being placed in tins or the like before insertion into the baking oven.

We would mention that several attempts have previously been made to carry out certain objects of our invention by mechanical means as opposed to hand labor but in some instances the results attained have not been successful beyond a certain degree inasmuch as the dough has not been worked properly by the means employed with the result that the bread, when baked, has been lacking in certain essential features the principal being volume and color. In other words, if the strands of gluten in the dough are broken, or not properly stretched, the resulting loaf will be short of volume and texture and darker in color than is the case when the dough has been thoroughly worked and stretched.

We are also aware that it has been proposed to employ mechanical means in which a moving member or members is adapted to rotate so that it spins or winds under tension the dough which is fed to the said member in the form of a strip in order that the gluten may be stretched during the working of the dough so as to make the resulting bread light and spongy.

The object of the present invention is to provide improved apparatus by which certain good results, obtainable by hand molding and shaping, are obtained, the process being carried out in a more expeditious manner with a consequent saving in time and labor resulting also in a better mold or shape being obtained, fully molded throughout the mass of dough, said mold also being of a correct size as may be predetermined, and being so dealt with by our device that one passage through the said device prior to the mold being placed in the baking or oven tin, is found to answer our requirements, it not being necessary as in some devices previously proposed, for a like purpose, to have to pass the dough more than once through the machine or even to pass it through an additional machine.

Further, no guide or strip forming rollers are necessary as has also been proposed, our improved apparatus being capable of adjustment so that the mold may fit exactly a tin or the like of any required size within certain limits, preparatory to being placed in the oven.

Further, the improved apparatus is such as to occupy but comparatively small space and generally the apparatus will be characterized by several other features tending to carry out the process in an expeditious and efficient manner.

The improved apparatus differs essentially in its principle or method of molding, shaping and stretching the dough from all previous mechanical means inasmuch as a clot or lump of dough, previously scaled by weighing and dividing the required quantity from the mass of dough, is delivered in such manner as to engage with a pair of rotating spindles or bars of any suitable section placed tandem and with their adjacent ends say about one inch apart, but driven at different speeds although in the same direction, and simultaneously with the engagement of the dough the rotating spindles by the depression of a spring influenced table setting in motion means such as a cam or cams to draw the spindles apart whereby the ends of the lump of dough are drawn apart and stretched and twisted into an approximately double helix by the action of the receding spindles which are rotating at different speeds. The stretched and twisted dough is then stripped from the ends of the receding spindles as they reach the end of their withdrawal by means of a part termed a table clearer and the lump of dough, after proving, is then ready for the oven.

In the accompanying two sheets of drawings,—

Fig. 2 represents a sectional elevation taken through the line $a$—$b$ of Fig. 1 and Figs. 3 to 6 inclusive, represent details of certain portions of the mechanism.

Fig. 7 is a transverse sectional view taken on line VII—VII of Fig. 1 and looking in the direction of the arrows.

Figure 1:
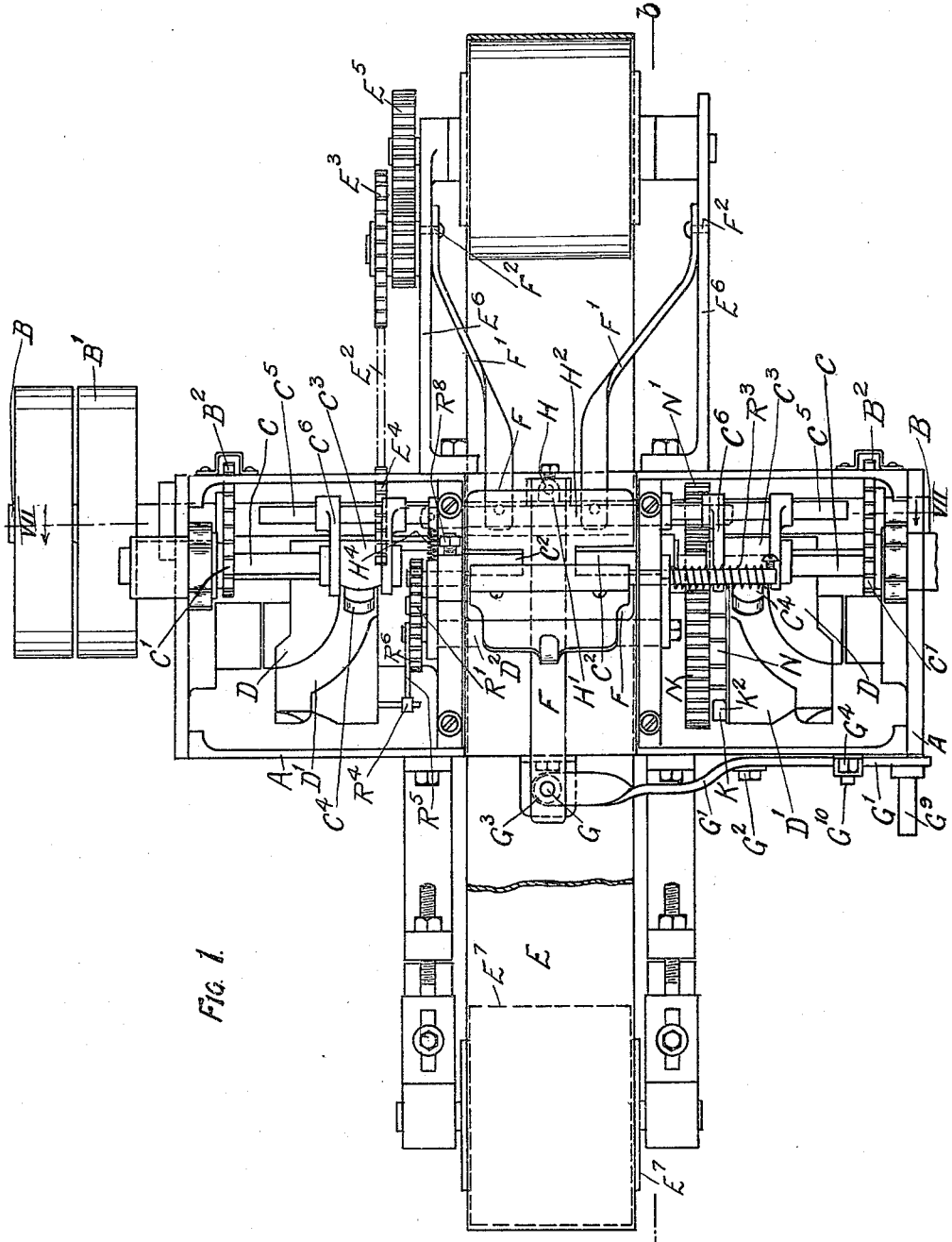
Figure 1 represents a plan view of our improved apparatus the top covers being removed to show the mechanism more clearly.

In carrying our invention into effect we provide a suitable frame work A which may be in the form of a box like casing so as to serve as an oil retainer and lubricator and to form a dust proof covering for the mechanism. Mounted in bearings in said casing is the main driving shaft B of the apparatus carrying suitable driving means such as the usual fast and loose belt or like pulleys B'. Sprocket wheels $B^2$ are fixed to the driving shaft B the said wheels, by means of a chain rotating sprocket wheels C', and therefore the spindles C, there being two such spindles as hereinafter referred to.

For simplicity of description, we will describe one of the spindles C which is supported in suitable bearings and has one end $C^2$ shaped to a suitable configuration or cross section for the engagement of the dough, one form having two grooves, recesses or the like arranged opposite each other, to give a cross section somewhat Z-shaped, as shown in Fig. 2, and in detail by Fig. 6. This form has been found to give good results during the carrying out of our experiments. The said spindles C are situated on or near the same center line of rotation and are so arranged as to rotate in the same direction but at different speeds, thus imparting to the dough being treated a twist that is, in a manner, approximating somewhat to a helical or like spiral curve. The spindles C are caused to move simultaneously in opposite directions in an intermittent manner by the following means:—

One of these driving gears $B^2$ and each spindle C is mounted for rotation with its respective spindle and is also capable of longitudinal movement thereon by means of a key and slot connection, as will be understood.

We mount on each spindle C a collar or the like $C^3$ carrying a projection $C^4$ which may be in the form of an antifriction roller which latter enters a groove or recessed portion D' of a cam member D the latter being keyed on a shaft $D^2$, there being two such cam members as shown. The collar or the like $C^3$ is assisted to travel steadily by a steady shaft $C^5$, arms $C^6$ from the collar $C^3$ being arranged to slide on the said shaft $C^5$.

Owing to the continuation of the slot in cam D, which will be more fully described hereinafter, reciprocatory movement is imparted to the spindle C through the projection $C^4$ and by virtue of the key and slot connection D' the gear $B^2$ and the spindle B, rotary movement may be imparted to the spindle during the reciprocation thereof. It will thus be seen that rotary and reciprocatory movements may be imparted to each of the spindles C at one and the same time.

Situated so as to pass below the spindles C, see Fig. 2, is a traveling conveyer or belt E passing around and being operated by a drum or pulley E' rotated say by a chain $E^2$ and sprocket wheels $E^3$ and $E^4$ the latter being mounted on the driving shaft B, suitable speed reducing gearing $E^5$ being provided if desired. The drum E' is supported in suitable bearings from brackets $E^6$ or other convenient form of attachment, the conveyer being of ordinary belt form, that is, as a single strip and constructed from any material adapted for the purpose, the conveyer E passing over another idle drum or carrier pulley $E^7$ similar to that last mentioned.

In this arrangement the dough is taken by the conveyer toward a table or tray F of suitable form, situated below the shaped portion $C^2$ of the spindles C and supported by arms or the like F' pivoted to a rigid part of the apparatus, say at $F^2$ to the brackets $E^6$. The table F is adapted to be depressed and to return to its original position, acting as a buffer or yielding support and for the purpose, as hereinafter described, and combines means so that the pressure on the table to depress the same can be allowed for and regulated, said means comprising a headed stud, rod or the like G bearing against the under side of the table F the stud working in conjunction with a pivoted lever G' fulcrumed at $G^2$. The spring $G^3$ is confined between the head of the stud G and the lever G' so as to normally maintain the table F in its raised position. A device for putting tension on the spring $G^3$ to regulate the depressibility of the table F is also provided as shown in Fig. 5 consisting of a plate $G^4$ notched say at $G^5$ and $G^6$ to be engaged by studs $G^7$ and $G^8$ on the lever G' so as to latch the lever G' in one or other of the two positions and thus apply more or less pressure to the table F. Suitable handles such as $G^9$ and $G^{10}$ are provided to facilitate the operation of the parts, the mechanism being such as to allow various weights of dough to be treated, the pressure being shown, by a suitable indicating device (not shown).

Attached to a portion of the depressible table F is a rod H or the like which may be adjusted at different positions by means of a screw $h$. This rod engages a projection H' on a rocking shaft $H^2$ having mounted on one end of the same an antifriction roller or other projection H³, a spring H⁴ being also provided in connection with the rocking shaft H² for the purpose of returning the said shaft to its normal position, after being oscillated as a result of the depression of the table, that is, when the latter has been returned to its original position. The projecting portion H³ of the rocking shaft H² is adapted and positioned to engage a spring controlled pawl lever or the like K mounted in a bearing plate K' formed in or on one of the cam members D mounted on the shaft D² adjacent to one of which cam members is a ratchet or catch wheel M the latter being attached to and rotating with a toothed wheel N which meshes with a pinion N' mounted on the main driving shaft B the wheels M and N being loosely mounted on the shaft D² carrying the cam members D.

The pawl lever K is such as to act as a clutch member for connecting and disconnecting the cam D to and from the catch wheel M and its attached gear wheel N and the pawl therefore controls the rotation of the cam in relation to the rotation of the driving shaft and consequently also the withdrawal of the spindles C.

The said pawl lever has thereon a part K³ for engaging the teeth of the catch wheel M in addition to having a tail piece K² which, when it meets the projection H³ on the shaft H² through the depression of the table F by the entrance of a clot of dough between the spindles and conveyer, moves the projection H³ out of the path of the tail piece K² thus allowing the pawl K³ to engage the teeth of the catch wheel M to cause the cams D to rotate with the toothed wheel N.

The groove D' in each of the cam members D is of suitable configuration a convenient form being a groove for the most part concentric with the periphery of the catch wheel M and having a portion somewhat of V shape to receive a runner or projection C⁴ on each spindle and move it in a course somewhat at right angles or thereabout to the concentric part of the groove, that is, away and toward the catch wheel as shown in the drawings, so as to give a horizontal intermittent backward and forward movement to the spindles C while they rotate at different speeds. The mechanism described is such that the spindles C are withdrawn from the dough after a pre-determined number of revolutions of such spindles which is arranged for according to the nature or quality of the dough being dealt with.

The table F may be arranged at an angle and is such as to form what may be termed a buffer or yielding support for applying pressure to assist the knitting together of the dough so as to tend to produce a mold of even shape and to give a good appearance to the finished loaf.

An arrangement of mechanism is desirable to insure the removal of the finished mold or shape should there be any tendency of the same to adhere to the ends of the spindles instead of passing along with the conveyer belt E. To this end we provide what may be termed a table clearing mechanism comprising a member, such as R, which may be somewhat angular or semicircular in shape and placed near the spindle ends C² the member R mounted on a shaft R² being operated by an eccentric or by a gear wheel train or other suitable motion and a lever arrangement.

In the drawings, we have shown the member R to be operated by a gear wheel train R' through a pin R⁴ on the adjacent cam D which engages a bar or the like R⁵ carried by the wheel R⁶ of the gear train, thus operating the member R on each revolution of the cam by the pin R⁴ coming into contact with the bar R⁵ to rotate the gear wheel. With the parts in the position shown in Fig. 2, the cam D is rotated in a clockwise direction. Pin R⁴ will then engage bar R⁵ in such direction as to cause the shaft R² to rotate in a clockwise direction, thereby swinging the member R to the position shown in dotted lines in Fig. 2. It will thus be seen that when the spindles C are receded, the member R will remove all dough which has adhered to said spindles. The shaft R² upon which the table clearer R is mounted is acted on by a spring R³ suitably disposed around the shaft R², the said spring being for the purpose of returning the table clearer R to the position shown by Fig. 2, that is, away from the spindle ends C² after the member R has stripped the mold of dough from the spindle ends, a stop R⁸ suitably positioned being also provided on the shaft R² to limit the extent of the rotation of the said shaft.

In operation, the clot or lump of dough of required weight is placed or delivered on to the conveyer belt E by any convenient means and is transferred to and engaged with the ends of the spindles C which, as already stated, are rotating at different speeds.

While the clot of dough is engaging with the ends of the spindles the table F is depressed which movement causes the catch pawl K to engage the catch wheel M which then makes one revolution as described during which the clot of dough is being shaped or molded into approximately a double helix by the combined differential rotary and recessional movements of the spindles. The molded dough is then stripped from the spindles by the action of the table clearer R and is carried forward by the conveyer E and sprayed with oil if desired before finally passing away from the apparatus.

What we claim as our invention and desire to secure by Letters Patent of the United States is:—

1. A machine for working dough comprising a pair of spindles, and mechanism for actuating said spindles to simultaneously twist and stretch the dough.

2. In apparatus for molding, shaping or otherwise working a clot or lump of dough, means comprising a pair of rotating spindles placed tandem with their shaped adjacent ends at a slight distance apart, means for driving said spindles in the same direction but at different speeds, means for causing the rotating spindles to recede from one another during the engagement of the dough with their shaped ends, and means for returning said spindles to their initial positions after the dough has been removed.

3. In apparatus for molding, shaping or otherwise working a clot of dough in combination a pair of rotating spindles placed tandem with their shaped ends at a slight distance apart; means for driving the said spindles in the same direction but at different speeds; means for causing the rotating spindles to recede from one another during contact with the dough and after the engagement of the clot of dough with their shaped ends and to return to their initial positions after the molded clot has been removed; and a table clearer with means for partially rotating the same to strip the stretched and twisted dough from the ends of the spindles.

4. In apparatus for molding, shaping or otherwise working a clot of dough in combination a pair of rotating spindles placed tandem with their shaped ends at a slight distance apart; means for driving the said spindles in the same direction but at different speeds; means for causing the rotating spindles to recede from one another during contact with the dough and after the engagement of the clot of dough with their shaped ends and return to their initial positions after the molded clot has been removed; a table clearer with means for partially rotating the same to strip the stretched and twisted dough from the ends of the spindles; a pivoted adjustable depressible table above which the dough is delivered; a catch member acted on by a projection; and springs to return the parts to their normal positions substantially as and for the purposes herein set forth.

5. A machine for working dough comprising means for stretching a quantity of dough, and means for twisting the dough during said stretching operation.

6. A machine for working dough comprising means for twisting a quantity of dough, and means for stretching the dough longitudinally with relation to the axis of the twisting of the dough.

7. A machine for working dough comprising a pair of spindles, means for rotating said spindles at different speeds and means for moving said spindles toward and away from each other during rotation thereof.

8. A machine for working dough comprising a pair of spindles, means for rotating said spindles at different speeds and in the same direction, and means for moving said spindles toward and away from each other during rotation thereof.

9. A machine for working dough comprising a continuously moving table for supporting the dough, a pair of spindles, means for rotating said spindles at different speeds and in the same direction, means adjacent said table for controlling mechanism for moving said spindles toward and away from each other.

10. A machine for working dough comprising a pair of spindles, mechanism for rotating said spindles at different speeds in the same direction, and for moving said spindles toward and away from each other during the rotation thereof, a movable supporting member biased to one position, and means actuated by the depression of said member for setting into operation that portion of said mechanism which moves said spindles toward and away from each other.

11. A machine for working dough comprising a pair of spindles, means for rotating said spindles at different speeds in the same direction, means for moving said spindles toward and away from each other during rotation thereof, and a conveyer belt continuously moving in one direction beneath said spindles.

12. A machine for working dough comprising a pair of spindles, means for rotating said spindles at different speeds, means for moving said spindles toward and away from each other during rotation thereof, a table for supporting the dough and a conveyer belt continuously moving in one direction between said table and spindles.

13. A machine for working dough comprising a pair of rotatable spindles arranged end to end, means for rotating said spindles at different speeds and means for causing said spindles to recede one from the other after said spindles have rotated a predetermined number of times.

14. A machine for working dough comprising a pair of rotatable spindles arranged end to end, means for rotating said spindles at different speeds, means for causing said spindles to recede one from the other after said spindles have rotated a predetermined number of times, and movable means for removing the dough from said spindles.

15. A machine for working dough comprising a pair of rotatable spindles arranged end to end, means for rotating said spindles, means for causing said spindles to recede one from the other after said spindles have rotated a predetermined number of times, and movable means coöperating with said spindles to cause removal of the dough therefrom when the same are receded.

16. A machine for working dough comprising a pair of spindles, means for rotating said spindles to twist the dough, and means for moving said spindles away from each other to stretch the dough during the twisting operation and returning them to their original position after said operation.

In testimony whereof we have signed our names to this specification in the presence of the subscribing witness.

EDGAR GREENWOOD.
ALFRED SHARP.

Witness:
HERBERT ROWLAND ABBEY.

Copies of this patent may be obtained for five cents each, by addressing the "Commissioner of Patents, Washington, D. C."